US011593237B2

(12) United States Patent
Nguyen et al.

(10) Patent No.: US 11,593,237 B2
(45) Date of Patent: Feb. 28, 2023

(54) FAST RECOVERY WITH ENHANCED RAID PROTECTION

(71) Applicant: INTERNATIONAL BUSINESS MACHINES CORPORATION

(72) Inventors: Tram Thi Mai Nguyen, Santa Clara, CA (US); Robert Lindsay Todd, Sand Lake, NY (US); Prasoon Sinha, Melbourne (AU); Sidney Varoni, Jr., Sydney (AU)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 17/303,434

(22) Filed: May 28, 2021

(65) Prior Publication Data

US 2022/0382656 A1    Dec. 1, 2022

(51) Int. Cl.
*G06F 11/16*    (2006.01)
*G06F 11/20*    (2006.01)
*G06F 3/06*    (2006.01)

(52) U.S. Cl.
CPC .......... *G06F 11/2094* (2013.01); *G06F 3/065* (2013.01); *G06F 3/0619* (2013.01); *G06F 3/0644* (2013.01); *G06F 3/0689* (2013.01); *G06F 11/2064* (2013.01); *G06F 11/2069* (2013.01); *G06F 2201/82* (2013.01)

(58) Field of Classification Search
CPC ............. G06F 11/2094; G06F 11/2064; G06F 11/2069; G06F 3/0619
USPC ........................................ 714/6.21–6.24, 6.3
See application file for complete search history.

(56) References Cited

U.S. PATENT DOCUMENTS

| 4,722,085 | A | 1/1988 | Flora |
| 4,761,785 | A | 8/1988 | Lawlor |
| 5,822,584 | A | 10/1998 | Thompson |
| 7,562,249 | B2 | 7/2009 | Daikokuya |
| 7,739,579 | B2 | 6/2010 | Kameyama |
| 7,788,335 | B2 * | 8/2010 | Miloushev ............ H04L 67/567 709/213 |

(Continued)

FOREIGN PATENT DOCUMENTS

| EP | 0519670 A2 | 12/1992 |
| WO | 1988009968 A | 12/1988 |

OTHER PUBLICATIONS

"Dynamic Redundancy Based on a Multipurpose Spare Partition Concept," IPCOM000265082D, IP.com, Feb. 23, 2021, 2 pages, https://priorart.ip.com/IPCOM/000265082.

(Continued)

*Primary Examiner* — Chae M Ko
(74) *Attorney, Agent, or Firm* — Grant Johnson

(57) ABSTRACT

The disclosure includes a computer-implemented method for providing fast data access after a drive failure, a computer program product, and a RAID controller. One embodiment may comprise identifying a RAID array, the RAID array comprising a plurality of storage volumes, identifying an unused block of a provisioned volume in the RAID array, and copying a redundant copy of high value host writes to the unused block. The copying may comprise, for primary strips in the RAID array, creating one or more secondary strips mirroring the primary strips such that each of pair of primary-secondary strips reside on different storage volumes from each other.

20 Claims, 5 Drawing Sheets

(56) References Cited

U.S. PATENT DOCUMENTS

| | | |
|---|---|---|
| 8,543,761 B2 | 9/2013 | Goldick |
| 8,751,861 B2 | 6/2014 | Nair |
| 9,606,866 B2 | 3/2017 | Taranta, II |
| 9,921,912 B1 | 3/2018 | Vankamamidi |
| 2004/0250161 A1* | 12/2004 | Patterson ............ G06F 11/1092 |
| | | 714/E11.034 |
| 2006/0041793 A1 | 2/2006 | Cherian |
| 2007/0101187 A1 | 5/2007 | Daikokuya |
| 2018/0357141 A1* | 12/2018 | Agombar ............ G06F 11/2089 |
| 2020/0310914 A1 | 10/2020 | Shatsky |

OTHER PUBLICATIONS

Distributed array properties, IBM FlashSystem 5200, 5000, 5100, Storwize V5100 and V5000E, v. 7.8.1, https://www.ibm.com/docs/en/f555sv-and-v/7.8.1?topic=configurations-distributed-array-properties, Mar. 4, 2021.

Yao, Jie, et al., "Elastic-RAID: A New Architecture for Improved Availability of Parity-Based RAIDs by Elastic Mirroring," IEEE Transactions on Parallel and Distributed Systems 27.4 (2016): 1044-1056.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

FAST RECOVERY WITH ENHANCED RAID PROTECTION

BACKGROUND

The present disclosure relates to data storage systems, and more specifically, to data storage virtualization.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

Today's computer systems typically include one or more storage devices, such as solid state drives (SSD), disk drives, etc., which may be configured into a logical storage group, such as a Redundant Array of Independent Disks (RAID) system. In some RAID systems, the underlying data may be stored redundantly across multiple storage devices in a variety of configurations to provide data security in the event of a hardware or software failure.

One example RAID topology is RAID-5. In a RAID 5 topology, the RAID system reads and writes data segments across multiple data drives and writes parity to the same data disks. Within any stripe of a five device RAID-5 topology, one device contains parity information while the remaining devices contain data. If any one of the drives fails, the remaining four drives may be used to regenerate both user data and parity, which improves data protection. Another RAID topology, RAID-6, improves the data protection of RAID-5 by providing two parity strips, typically called the "P" parity strip and the "Q" parity strip.

Yet another RAID topology is Distributed RAID ("DRAID"), in which the capacity of the spare drives is distributed across all the drives in the array as rebuild capacity. As a result, any rebuild workload may be spread across all the drives, rather just to a single spare drive, which may result in faster rebuilds on an array.

The parity strips in a DRAID system determines how many times the distributed array can recover failed drives without risking data loss. For example, a DRAID-6 system can handle two concurrent failures. After the failed drives have been rebuilt, the array can tolerate another two drive failures, as long as there is still sufficient rebuild capacity. However, if all of the rebuild areas are used to recover data, the array becomes degraded on the next drive failure.

SUMMARY

According to embodiments of the present disclosure, a computer-implemented method for providing fast data access after a drive failure comprising identifying a RAID array, the RAID array comprising a plurality of storage volumes, identifying an unused block of a provisioned volume in the RAID array, and copying a redundant copy of high value host writes to the unused block. The copying may comprise, for primary strips in the RAID array, creating one or more secondary strips mirroring the primary strips such that each of pair of primary-secondary strips reside on different storage volumes from each other. The copying may further comprise generating a primary-secondary strip mapping associating one or more primary strips containing the high value host writes with a corresponding one or more secondary strips.

According to embodiments of the present disclosure, a computer program product for a method for providing fast data access after a drive failure, comprising a computer readable storage medium having program instructions embodied therewith. The program instructions executable by a processor to cause the processor to identify a RAID array, the RAID array comprising a plurality of storage volumes and identify one or more unused block of a provisioned volume in a RAID array. The program instructions may further cause the processor to receive, from an administrator, a request to treat a file as high value, associate the file with a plurality of high value host writes, and copy a redundant copy of the plurality of high value host writes to the unused blocks. The copying may comprise, for primary strips in the RAID array, creating one or more secondary strips mirroring the primary strips such that each of pair of primary-secondary strips reside on different storage volumes from each other, generating a primary-secondary strip mapping associating one or more primary strips containing the high value host writes with a corresponding one or more secondary strips, and storing the primary-secondary strip mappings in a bitmap. The program instructions may further cause the processor to detect a failure of a drive containing at least one of the primary strips, and in response to the detecting, update the primary-secondary strip mapping to replace the at least one primary strip with one of its corresponding secondary strips, restore the at least one of the primary stripes from parity, and schedule creation of a new redundant copy of the restored primary stripe.

According to embodiments of the present disclosure, a RAID controller, comprising a processor configured to execute instructions that, when executed on the processor, cause the processor to identify a RAID array, the RAID array comprising a plurality of storage volumes, identify an unused block of a provisioned volume in a RAID array, and copy a redundant copy of high value host writes to the unused block. The copying may comprise, for primary strips in the RAID array, creating one or more secondary strips mirroring the primary strips such that each of pair of primary-secondary strips reside on different storage volumes from each other, and generating a primary-secondary strip mapping associating one or more primary strips containing the high value host writes with a corresponding one or more secondary strips.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
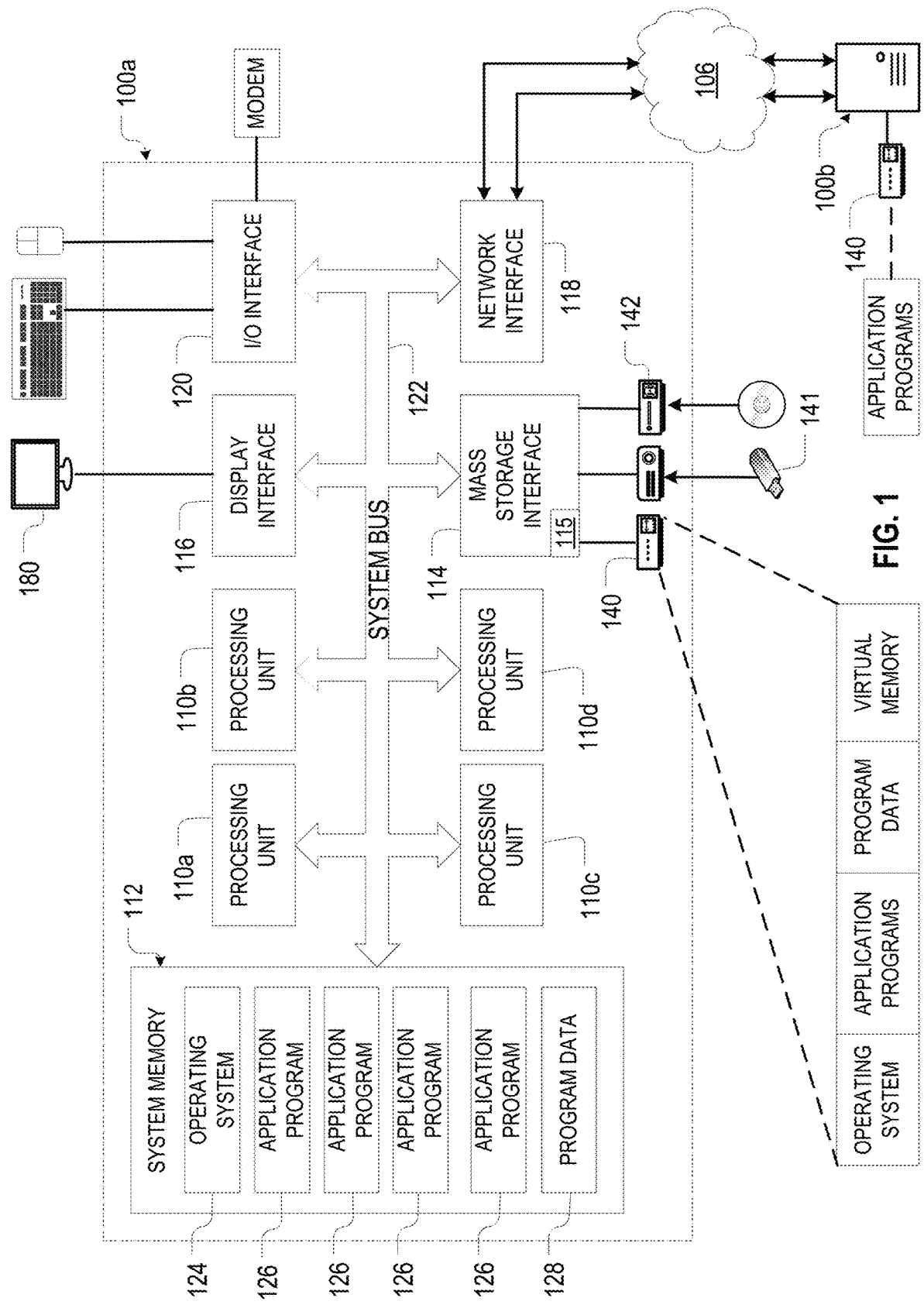
FIG. 1 illustrates an embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data storage systems; more particular aspects relate to data storage virtualization. While the present disclosure is not necessarily limited to such applications, various aspects of the disclosure may be appreciated through a discussion of various examples using this context.

A Redundant Array of Independent Disks ("RAID") system generally refers to a group of storage devices that work together to achieve relatively higher transfer rates and more secure storage of data than economically possible via a single, large drive. Even though multiple storage devices may be involved, the RAID system typically appears as one device (e.g., one drive) to the connected data processing system(s). RAID systems may be controlled by a dedicated array controller, or may be managed by the central processing unit of the associated data processing system.

RAID systems may distribute data across the individual storage devices according to the format of the particular RAID topology (e.g., RAID-1, 2, etc.). Copies or portions of data for a particular file may be written in segments on more than one device, a process referred to as "striping." By storing the data on multiple drives, the RAID controller can achieve relatively higher data transfer rates by scheduling read and write commands to multiple storage devices in parallel.

For example, when one storage device of the RAID system fails, data from that failed device may be re-created, e.g., rebuilt using error correction information from the remaining devices in the group. In most scenarios, the failed device will be re-created expeditiously to reduce the possibility that another component device will fail, resulting in permanent data loss, as well as to increase the availability of the data to the end users. That is, when a RAID system is being rebuilt due to a device failure, the read/write (more generically, input/output or "I/O") response time of the RAID array may be negatively impacted due to the competition for resources and/or the extra operations involved. If more resources are dedicated to rebuilding the RAID, the I/O performance suffers. If fewer resources are dedicated to servicing I/O requests, the rebuild time is extended. The longer rebuild time increases, however, the probability that a failure will occur that results in both permanent data loss.

Accordingly, one aspect of this disclosure is an enhanced method to reduce the performance impact of storage device failures for end users (e.g., by reducing rebuild times during peak use times). In some embodiments, unallocated and/or unprovisioned storage capacity may be utilized to provide faster data access to high value data during a storage device failure and/or degraded state of the storage system. This enhanced method may include a method to utilize the unallocated and/or unprovisioned capacity of provisioned volumes to map an extra redundant copy (i.e., two or more total copies) of high value host writes (i.e., of the comparatively higher value data in the RAID array, such as e.g., business critical information, system critical information, etc.) These redundant cop(ies) may be used for instant data access in case of a storage device failure and/or while the storage system in a degraded performance state due to the impact of a RAID rebuild process.

Accordingly, one feature and advantage of some embodiments can be relatively faster access to high value volumes (HVV) in a storage system after failure of one or more individual storage devices in the storage system and/or in a degraded RAID scenario. For example, a conventional DRAID-6 may save two parity bits for each write so it can tolerate up to two device failures. However, upon a third drive failure, the RAID parity in the conventional DRAID-6 can be insufficient, and data on that RAID system can be lost. Some embodiments of this disclosure, in contrast, may maintain a copy of data and/or parity for the protected HVV volume(s) in the unallocated and/or unprovisioned space in the storage system so that, in a single or double device failure scenario, the copy can be accessed. This, in turn, may avoid the need for an immediate rebuild of the failed device. Similarly, in the example triple drive failure scenario discussed above, the RAID array can be recovered after replacing the failed drives instead of having to recreate it from scratch (e.g., from a journal, tape backup, etc.). Post recovery, the protected volumes are now immediately available for additional reads and writes.

Additionally, in some embodiments, the system administrator may select to enable or disable the enhanced protection at the volume-level, per business requirements. This can be useful in scenarios where the system administrator may identify a set of HVV volumes that periodically take heavy writes from a latency sensitive operation and/or for which a drive failure that triggers a RAID rebuild process may significantly degrade system performance. Accordingly, some embodiments of the present disclosure may enable the enhanced protection for the identified HVV volumes, and not for the other volumes in the RAID system. In this way, such embodiments may free-up the associated storage capacity (e.g., return it to an unused state) for any non-HVV (e.g., relatively less mission critical) volumes. Additionally, some embodiments may reduce the impact the of RAID rebuilds during predetermined time-frames, e.g., times of relatively heavy use, by selectively disabling rebuild or replacement of the enhanced protection.

Further, in some embodiments of the present disclosure, a RAID array may be configured with more than one spare drive and/or with additional global spare space. Conventionally, this may involve reserving additional drive capacity for contingency purposes. However, some embodiments of the present disclosure may selectively enable the enhanced protection features on top of the currently configured RAID configuration without additional storage capacity.

Also, in some embodiments of the present disclosure, a secondary copy of any file can be deleted manually (when the user and/or administrator wants to free up storage capacity, for example). Later, if the user or administrator wants to protect the volume again and has storage capacity for the copy, they may reinstate protection.

Data Processing System

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The one or more direct access storage devices 140 may be logically organized into a RAID array, which in turn, may be managed by a RAID controller 115 in e.g., the mass storage interface 114, by software executing on the processor 110, or a combination of both. The network interfaces 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
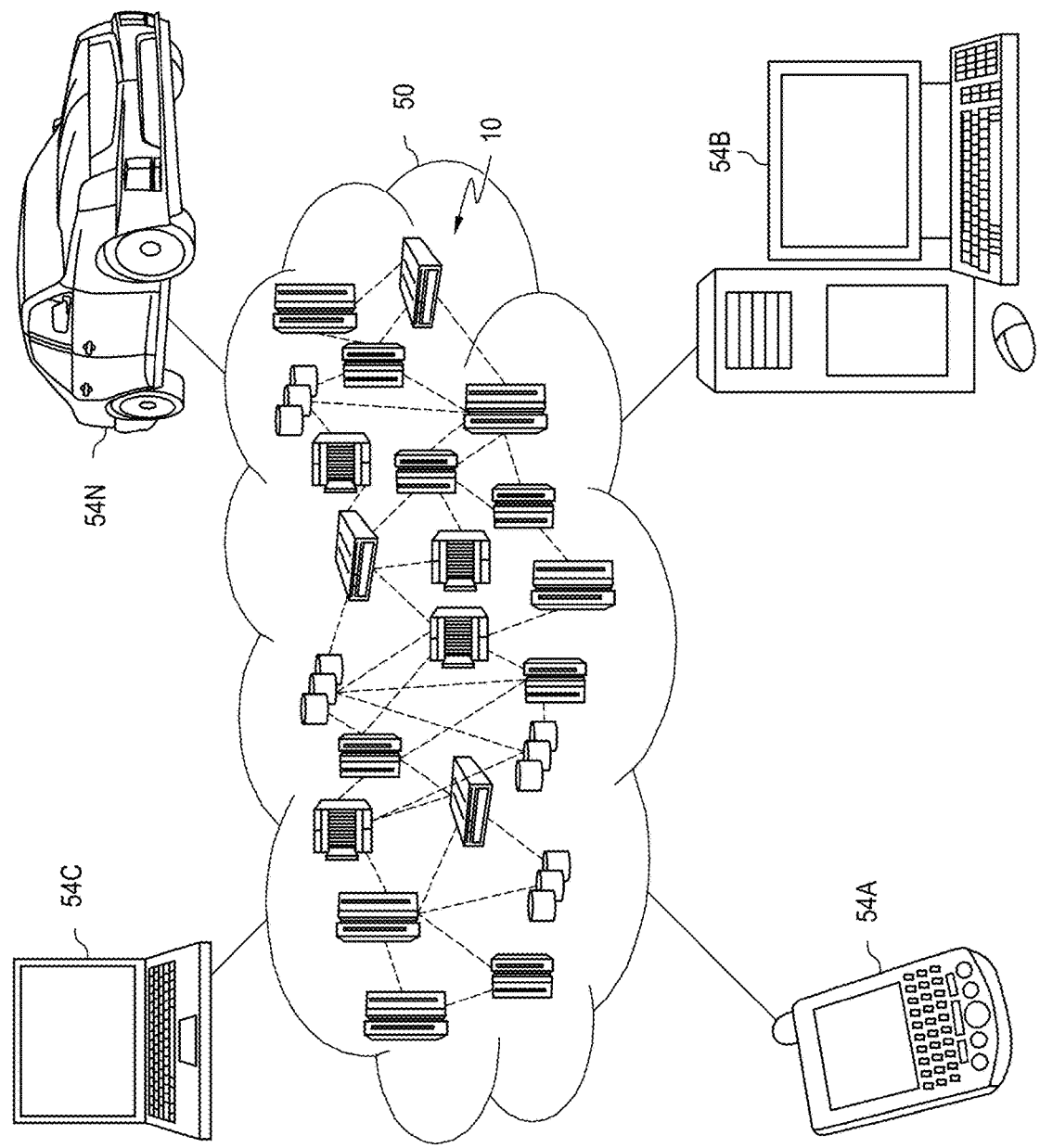
FIG. 2 depicts a cloud computing environment, consistent with some embodiments.

FIG. 2 illustrates one embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:
Private cloud: the cloud infrastructure is operated solely for an organization. It may be managed by the organization or a third party and may exist on-premises or off-premises.
Community cloud: the cloud infrastructure is shared by several organizations and supports a specific community that has shared concerns (e.g., mission, security requirements, policy, and compliance considerations). It may be managed by the organizations or a third party and may exist on-premises or off-premises.
Public cloud: the cloud infrastructure is made available to the general public or a large industry group and is owned by an organization selling cloud services.
Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
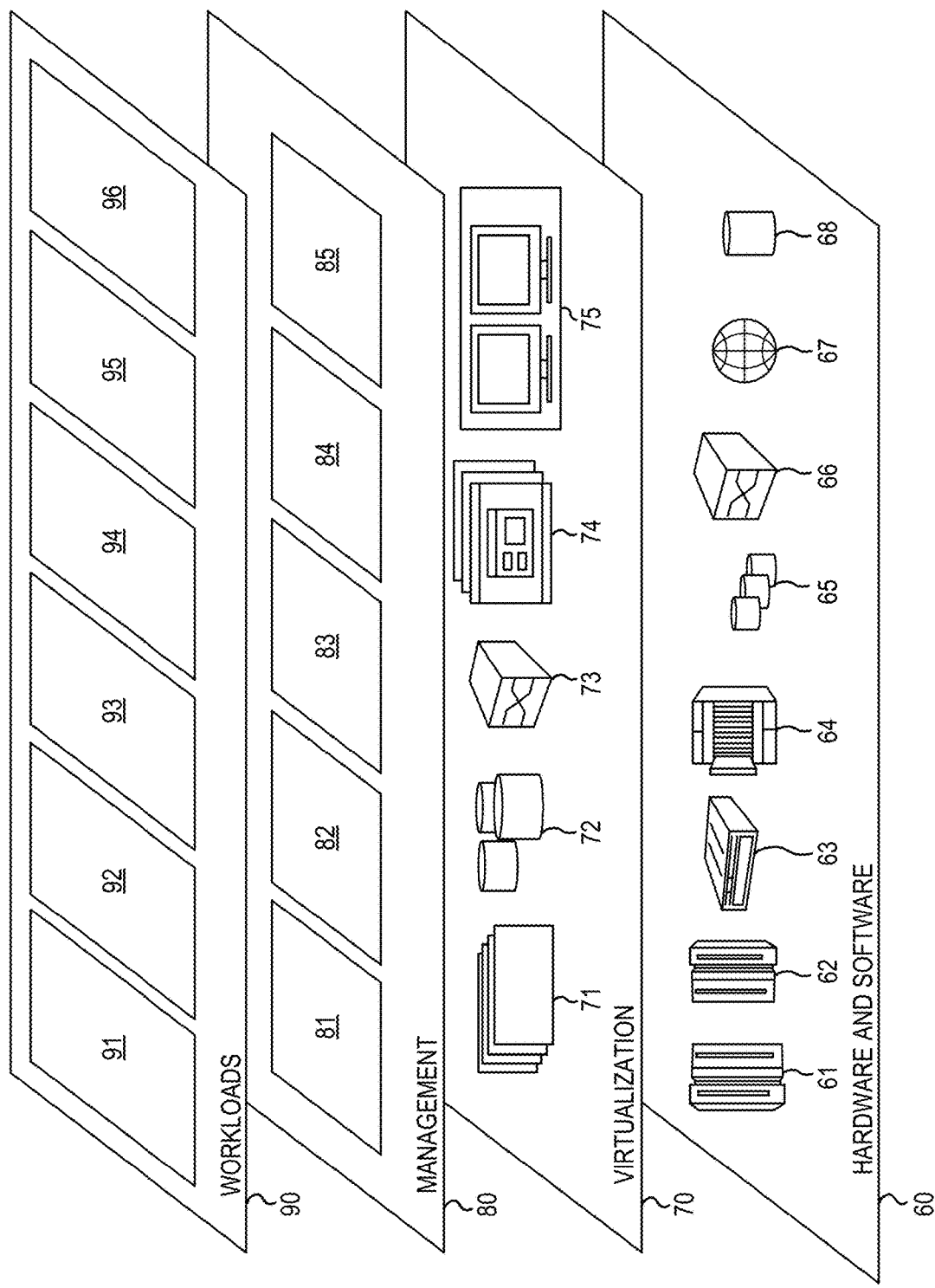
FIG. 3 depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an administrative interface 96.

Setup and Operation

In operation, the administrator may begin by selecting one or more volumes, files, folders, etc. to be treated as HVV. The host DPS 100 may send to these HVV volumes to the mass storage interface 114, and the corresponding data may be written on its associated physical storage (e.g., SSD drives).

The physical storage, in turn, may be part of a RAID array. The data in this RAID array may be split into small pieces ("stripes"), and each stripe (including both data and parity stripes) may be stored at one or more primary physical block address ("Primary PBAs"). For each of these stripes, partial data may be written to the storage device(s) participating on that one stripe, and are called "strips." Additionally, the primary PBAs containing the identified HVV data may be duplicated/mirrored in otherwise unused (e.g., unallocated and/or unprovisioned) space in the one or more storage devices in the RAID array ("Secondary PBAs").

In some embodiments, for every stripe identified as a high value primary strip (e.g., containing HVV), a corresponding Secondary strip may be identified such that each of pair of primary-secondary strips reside on different storage devices in the RAID array from each other (e.g., no primary-secondary strip pairs reside on the same storage device within the RAID array). In some embodiments, the primary strip may be copied/mirrored to its corresponding secondary strip location when the enhanced protection is enabled. The storage system may maintain primary-secondary strip pair mapping information transparently to the host as a bit map. More specifically, in some embodiments, for each of the primary PBAs, a corresponding secondary PBA may be identified and/or created such that no pair of primary PBAs and secondary PBAs reside on the same physical storage device within the RAID array. The data in the Primary PBA may be copied to its corresponding secondary PBA location when the enhanced protection is enabled. The storage system may maintain this primary-secondary PBA mapping information transparently to the host as a bit map.

In some embodiments, a storage administrator tool can show, in real-time, the percentage of the actual written data protected by this secondary-strip copy for each of the marked volumes. Some embodiments may also provide additional functions for administrators to (i) delete this secondary copy at any time; (ii) mark a priority order at volume level. The priority order, in turn, may be used to automatically overwrite and/or delete the secondary cop(ies) in case storage system needs to free-up storage capacity at the backend and/or for storage has used up all possible primary-secondary strip pair combinations, such that primary and secondary strips do not reside on the same storage devices.

In some embodiments, logical block addressing (LBA) may be used for address translation between host writes on volumes in the RAID array and the physical storage devices. An LBA range may be created in the RAID array. Logical volumes, in turn, may be carved from within the LBA range and mapped to associated physical storage devices. The host DPS 100 may communicate with the physical storage devices in terms of the LBAs or the LBA range, and the physical storage devices may maintain an LBA-to-PBA correlation (or mapping). As a result, each write to an LBA may be written to a mapped PBA on the physical storage device.

Figure 4:
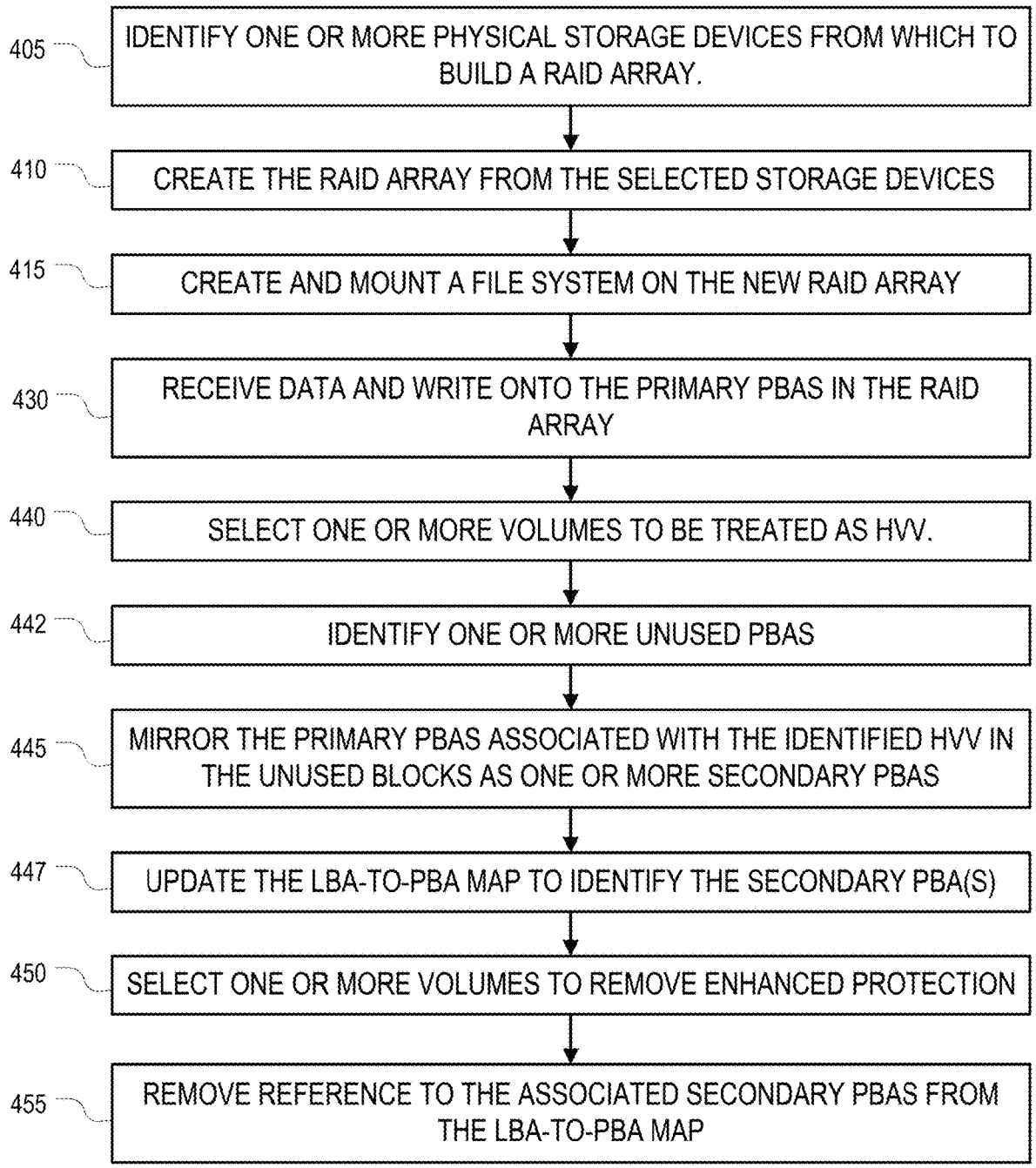
FIG. 4 is a flow chart illustrating one method of operating a RAID array, consistent with some embodiments of this disclosure.

FIG. 4 is a flow chart illustrating one method of operating a RAID array, consistent with some embodiments of this disclosure. At operation 405, an administrator of a cloud environment 50 may identify one or more physical storage devices from which to build a RAID array. In some examples, the administrator may select four or more storage devices.

At operation 410, the administrator may issue commands instructing the DPS system(s) 100 associated with the selected storage devices to create the RAID array. In response, the RAID controller 115 may create the requested RAID array.

At operation 415, the administrator may issue commands instructing the host DPS 100 to create and mount a file system on the new RAID array. In response, the RAID controller 115 may initialize the LBA-to-PBA map for the new file system. Further, the RAID controller 115 may allocate and/or provision subsets of the new RAID array to specific end users of the cloud environment 50. The host DPS 100 may receive data from other DPSs 100a in the cloud environment 50, and in response, write that data onto the primary PBAs in the RAID array at operation 430. In some embodiments, operations 410-430 may be performed by the specialized RAID controller 115 in the host DPS 100.

At operation 440, the administrator may issue commands to select one or more volumes, files, folders, etc., in the file system to be treated as HVV. In response, the DPS 100 hosting the RAID array may identify one or more unused (e.g., unallocated and/or unprovisioned) PBAs on a storage device connected to that DPS 100 at operation 442. This may include identifying one or more storage device(s) currently designated as spare storage devices and/or identifying unused blocks on storage device(s) that are currently part of the RAID array but not assigned to any current user of that array.

At operation 445, the RAID array may copy/mirror the primary PBAs associated with the identified HVV in the unused blocks as one or more secondary PBAs. Next, the DPS may update the LBA-to-PBA map to identify the new secondary PBA(s) at operation 447. In some embodiments, operations 440-447 may also performed by the specialized RAID controller 115 in the host DPS 100. Flow may then return to operation 430.

Optionally, at operation 450, the administrator may subsequently decide that some or all of the identified HVV is no longer mission critical and/or that the storage is needed for other, more urgent, uses. The administrator may instruct the RAID controller 115 to return the associated storage to an unprovisioned and/or unallocated state. In response, the RAID controller 115 may update LBA-to-PBA map to remove reference to the associated secondary PBAs at operation 455. This remapping operation returns the secondary PBAs to the unused (e.g., unprovisioned and/or unallocated) state. It can now be overwritten by other storage processes.

Recovery from Storage Failure

If one of the storage devices in the RAID array fails, HVV data on that device may still be made available to the system using the secondary PBAs. Accordingly, the RAID controller 115 may update the LBA-to-PBA mapping to reclassify one or more of the secondary PBAs containing the HVV as the primary PBA for that HVV. That is, in the event of a failure of a single storage device, the LBA-to-PBA map may be updated to point to a secondary PBA location instead of the primary PBA location. This LBA-to-PBA re-mapping may be desirable because it may abstract/hide these changes from downstream consumers (e.g., hosts, databases, applications, etc.). That is, other concerned components in the input/output (I/O) stream may continue to work seamlessly. This LBA-to-PBA re-mapping may also be desirable because it may avoid triggering an immediate rebuild operation (and/or operation without data protection), thereby reducing the immediate impact of a RAID rebuild process on the volumes marked as high value. If continued enhanced protection is desired, a new secondary PBA may be created as a relatively lower priority job and/or created during a non-peak time period. Additionally, this LBA-to-PBA re-mapping may reduce the overall RAID rebuild time because any compromised data can be directly copied from the secondary copies (i.e., on the secondary PBAs), rather than rebuilt from parity data.

Figure 5:
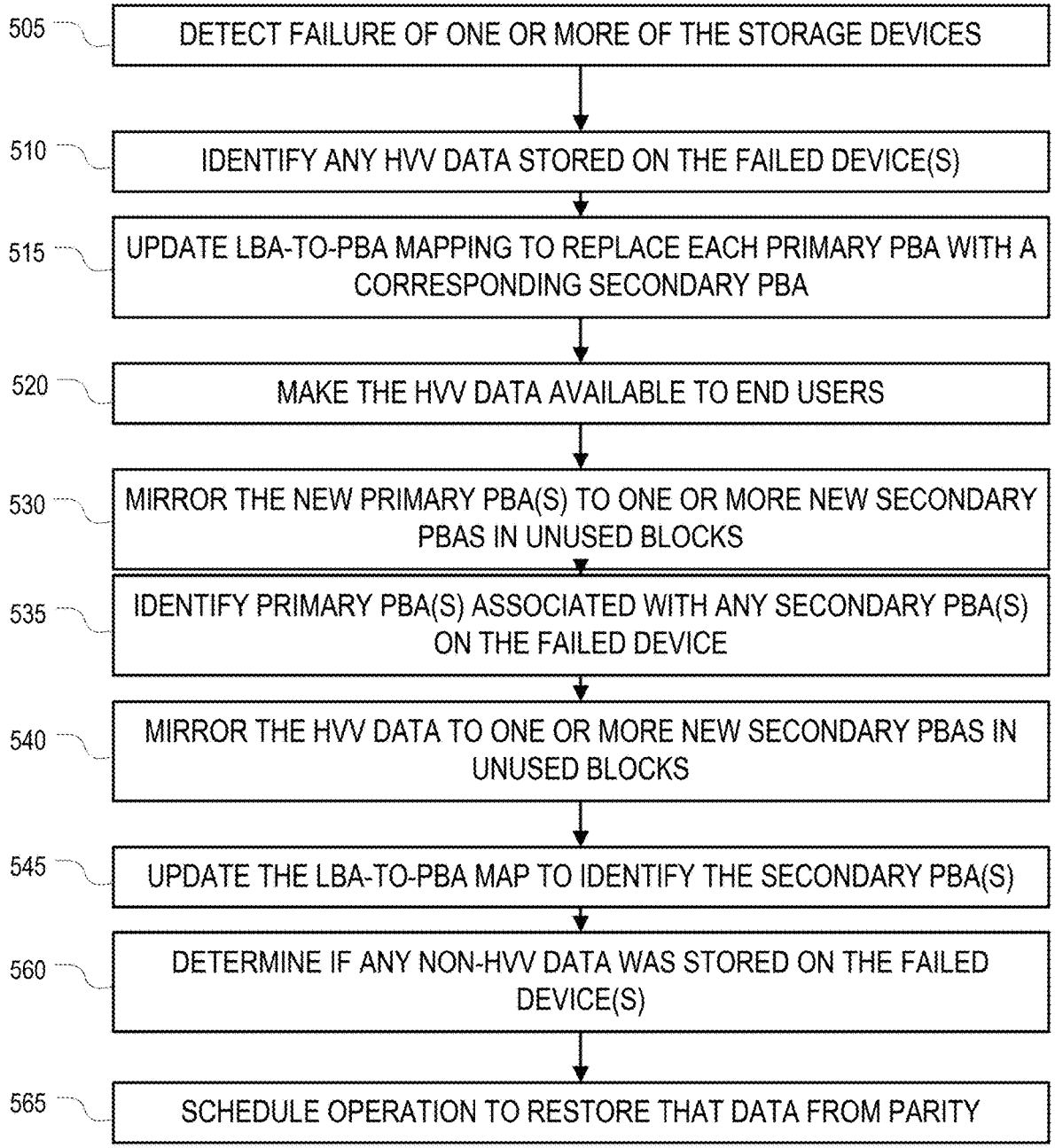
FIG. 5 is a flow chart illustrating one method of recovering from a failure of a storage device, consistent with some embodiments of this disclosure.

FIG. 5 is a flow chart illustrating one method of recovering from a failure of a storage device, consistent with some embodiments of this disclosure. At operation 505, the DPS 100 hosting the RAID array detects the failure of one or more of the storage devices in the array.

In response to the detected failure, the DPS 100 may use the LBA-to-PBA mapping to identify any HVV data that was stored on the failed device(s) at operation 510. For any primary PBAs, the DPS 100 may update the LBA-to-PBA mapping to replace each primary PBA associated with the HVV with a corresponding secondary PBA operation 515. The DPS 100 may then immediately make the HVV data available to end users at operation 520. Optionally, the DPS 100 may copy/mirror the (new) primary PBA(s) associated with the identified HVV to one or more (new) secondary PBAs in one or more unused blocks in the array at operation 525, and then update the LBA-to-PBA mapping to contain the new secondary PBAs at operation 530. Operations 525-530 may be desirable to ensure access in the event of a second device failure, and may be facilitated by the specialized RAID controller 115 in the host DPS 100.

For any secondary PBA(s) on the failed device, the DPS 100 may identify the associated primary PBA(s) at operation 535 and then copy/mirror the HVV data to one or more (new) secondary PBAs in one or more unused blocks at operation 540. The DPS 100 may update the LBA-to-PBA mapping to identify/contain the new secondary PBA(s) operation 545. Operations 535-540 may be performed by the specialized RAID controller 115 in the host DPS 100.

At operation 560, the DPS 100 may use the LBA-to-PBA mapping to determine if any non-HVV data was stored on the failed device(s). If so, the DPS 100 may schedule an operation to restore that data from parity onto a spare storage device at operation 565. This scheduled restore operation may be performed immediately at a relatively low priority and/or may be performed during non-peak time periods. Operations 560-565 may also be performed by the specialized RAID controller 115 in the host DPS 100.

Examples

To better explain the working mechanisms, a series of DRAID-6 arrays consistent with the present disclosure are presented. However, embodiments of the are not limited to use with DRAID-6 topologies. Other RAID topologies are within the scope of this disclosure.

Table 1 shows a first example DRAID-6 array consistent with some embodiments of this disclosure. In this example, volume 'Vol1' has been marked for enhanced protection using the methods described with reference to FIG. 4. Vol1, in turn, comprises four stripes (i.e., v11, v12, v13, v14 on Drive-1, Drive-2, Drive-3 and Drive-4, respectively) as primary copies. Put differently, v11, v12, v13, v14 are the primary PBAs corresponding to volume Vol1. PVol1 represents the 'P' Parity for Vol1, QVol1 represents the 'Q' Parity for Vol1 Writes. Because v11, v12, v13, and v14 have been marked for enhanced protection (e.g., they contain HVV data), the RAID array automatically may mirror that data in unused space on the RAID array as secondary copies (i.e., pcv11, pcv12, pcv13, and pcv14), as well as mirror the parity bits for that data (i.e., pcv11, pcv12, pcv13, and pcv14; and qcv11, qcv12, qcv13, and qcv14)

A RAID array consistent with some embodiments of this disclosure may ensure that the primary copies are striped across all storage devices that form the RAID array e.g., such that v11—resides on Drive1, v12—resides on Drive2, v13—resides on Drive3, and v14—resides on Drive4. A RAID array consistent with some embodiments of this disclosure may also ensure that the secondary copies are not stored on the same storage device as their corresponding primary copies (e.g., v11 resides on Drive-1, cv11 resides on Drive-3, v12 resides on Drive-2, cv12 resides on Drive-2, etc.)

TABLE 1

|  | Vol1 | PVol1 | QVol1 | cVol1 | PcVol1 | QcVol1 |
| --- | --- | --- | --- | --- | --- | --- |
| Drive-1 | v11 | pv13 | qv14 | cv13 | pcv12 | qcv13 |
| Drive-2 | v12 | pv14 | qv13 | cv11 | pcv13 | qcv14 |
| Drive-3 | v13 | pv12 | qv11 | cv14 | pcv11 | qcv12 |
| Drive-4 | v14 | pv11 | qv12 | cv12 | pcv13 | qcv11 |
| SPARE |  |  |  |  |  |  |

Table 2 shows the DRAID-6 system of Table 1 after a single drive failure of one of the drives i.e., Drive-1 in this example, indicated with '*.'

TABLE 2

|  | Vol1 | PVol1 | QVol1 | cVol1 | PcVol1 | QcVol1 |
| --- | --- | --- | --- | --- | --- | --- |
| *Drive-1 | *v11 | *pv13 | *qv14 | *cv13 | *pcv12 | *qcv13 |
| Drive-2 | v12 | pv14 | qv13 | cv11 | pcv13 | qcv14 |
| Drive-3 | v13 | pv12 | qv11 | cv14 | pcv11 | qcv12 |
| Drive-4 | v14 | pv11 | qv12 | cv12 | pcv13 | qcv11 |
| SPARE |  |  |  |  |  |  |

In this example and consistent with some embodiments, volume Vol1 may still be accessible via data volumes: v12, v13, v14, cv11 after the failure of Drive-1 by updating the LBA-to-PBA mapping (i.e., use cv11 instead of PDA v11, which was on the failed Drive-1). In this way, the secondary PDA "cv11" may be seamlessly accessible by end users without waiting for Vol1 to be rebuilt from parity. In contrast, a conventional RAID-6 system this scenario would require a parity rebuild of v11 onto the spare drive in this scenario, which will take considerable time and consume considerable computing resources.

Table 3 shows the DRAID-6 system of Table 1 after a double drive failure i.e., Drive-1 and Drive-2 in this example, again indicated with '*.' In this example, volume Vol1 is accessible via v13, v14, cv12 (instead of v12 which is down). V11 is accessible after the rebuild from parity is completed.

TABLE 3

|  | Vol1 | PVol1 | Vol1 | cVol1 | PcVol1 | QcVol1 |
| --- | --- | --- | --- | --- | --- | --- |
| *Drive-1 | *v11 | *pv13 | *qv14 | *cv13 | *pcv12 | *qcv13 |
| *Drive-2 | *v12 | *pv14 | *qv13 | *cv11 | *pcv13 | *qcv14 |
| Drive-3 | v13 | pv12 | qv11 | cv14 | pcv11 | qcv12 |
| Drive-4 | v14 | pv11 | qv12 | cv12 | pcv13 | qcv11 |
| SPARE |  |  |  |  |  |  |

Table 4 shows the DRAID-6 system of Table 1 after a triple drive failure i.e., Drive-1, Drive-2 and Drive-3 all fail, again indicated with '*.'

TABLE 4

|  | Vol1 | PVol1 | QVol1 | cVol1 | PcVol1 | QcVol1 |
| --- | --- | --- | --- | --- | --- | --- |
| *Drive-1 | *v11 | *pv13 | *qv14 | *cv13 | *pcv12 | *qcv13 |
| *Drive-2 | *v12 | *pv14 | *qv13 | *cv11 | *pcv13 | *qcv14 |
| *Drive-3 | *v13 | *pv12 | *qv11 | *cv14 | *pcv11 | *qcv12 |
| Drive-4 | v14 | pv11 | qv12 | cv12 | pcv13 | qcv11 |
| SPARE |  |  |  |  |  |  |

In this example scenario, volume Vol1 is accessible via v14, cv12 (instead of v12 which is down), v11, and v13, where v11 and v13 are accessible after the rebuild from parity is completed. Significantly, in a conventional DRAID-6 system, all data would be lost upon the third drive failure, unlike in the disclosed system with its enhanced protection.

Table 5 shows the DRAID-6 system of Table 1 in a scenario where three drives fail during rebuild process i.e., Drive-1 fails triggering a RAID rebuild onto a spare drive; thereafter, Drive-2 fails; as the RAID rebuild completes, Drive-3 fails, again indicated with '*.' In this scenario, in a RAID system using some embodiments of the disclosure, volume Vol1 would still be accessible via v14, v11, cv12 and cv13 (i.e., instead of v12 and v13, which are down). And, unlike a conventional DRAID-6 array, none of the stripes is rebuilt from parity.

TABLE 5

|  | Vol1 | PVol1 | QVol1 | cVol1 | PcVol1 | QcVol1 |
|---|---|---|---|---|---|---|
| *Drive-1 | *v11 | *pv13 | *qv14 | *cv13 | *pcv12 | *qcv13 |
| *Drive-2 | *v12 | *pv14 | *qv13 | *cv11 | *pcv13 | *qcv14 |
| *Drive-3 | *v13 | *pv12 | *qv11 | *cv14 | *pcv11 | *qcv12 |
| Drive-4 | v14 | pv11 | qv12 | cv12 | pcv13 | qcv11 |
| SPARE | v11 | pv13 | qv14 | cv13 | pcv12 | qcv13 |

Table 6 shows the DRAID-6 system of Table 1 in a scenario where four drives fail during rebuild process i.e., Drive-1, Drive-2, Drive3 and the spare drive fail, again indicated with '*.'

TABLE 6

|  | Vol1 | PVol1 | QVol1 | cVol1 | PcVol1 | QcVol1 |
|---|---|---|---|---|---|---|
| *Drive-1 | *v11 | *pv13 | *qv14 | *cv13 | *pcv12 | *qcv13 |
| *Drive-2 | *v12 | *pv14 | *qv13 | *cv11 | *pcv13 | *qcv14 |
| *Drive-3 | *v13 | *pv12 | *qv11 | *cv14 | *pcv11 | *qcv12 |
| Drive-4 | v14 | pv11 | qv12 | cv12 | pcv13 | qcv11 |
| SPARE | *v11 | *pv13 | *qv14 | *cv13 | *pcv12 | *qcv13 |

As with previous examples, in a conventional DRAID-6 array, all data may be lost when the fourth drive fails (i.e., spare drive in this example). However, with an array built according to some embodiments of the invention, Vol1 data blocks (v14, cv12) & parity blocks (pv11, qv12, pcv13, qcv11) are still available (i.e., instead of the missing Vol1 data blocks, v11 and cv13) once a number of failed drives are replaced to bring the array online. For example, Vol1 i.e., the volume containing the HVV in this example, is available for read and write access. Embodiments of the present disclosure may also reduce the overall array recovery time because data can be restored from parity rather than backup tapes or journaling.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A computer-implemented method for providing fast data access after a drive failure, comprising:
   identifying a RAID array, the RAID array comprising a plurality of storage volumes;
   identifying an unused block of a provisioned volume in the RAID array; and
   copying a redundant copy of high value host writes to the unused block, wherein the copying comprises:
      for primary strips in the RAID array, creating one or more secondary strips mirroring the primary strips such that each of pair of primary-secondary strips reside on different storage volumes from each other.

2. The method of claim 1, wherein the copying further comprises generating a primary-secondary strip mapping associating one or more primary strips containing the high value host writes with a corresponding one or more secondary strips.

3. The method of claim 2, further comprising storing the primary-secondary strip mapping in a bitmap.

4. The method of claim 2, further comprising:
   detecting a failure of a drive containing one of the primary strips; and
   in response to the detecting, updating the primary-secondary strip mapping to replace the one of the primary strips contained on the failed drive with one of its corresponding secondary strips.

5. The method of claim 4, further comprising in response to the detecting: restoring the one of the primary strips from parity; and scheduling creation of a new redundant copy of the restored primary strip.

6. The method of claim 2, further comprising:
   receiving, from an administrator, a request to treat a file as high value; and
   associating the file with one or more of the high value host writes.

7. The method of claim 6, further comprising:
   receiving, from the administrator, a request to stop treating the file as high value; and
   removing one or more secondary strips associated with the file from the primary-secondary strip mapping.

8. The method of claim 1, further comprising:
   creating the RAID array from a plurality of storage devices operably connected to a data processing system, wherein the RAID array comprises a plurality of blocks; and
   provisioning a first volume in the RAID array, wherein the provisioning comprises associating a first subset of the plurality of blocks with the first volume.

9. The method of claim 8, wherein the first volume is associated with a first of a plurality of users of the data processing system.

10. A computer program product for method for providing fast data access after a drive failure, comprising a computer readable storage medium having program instructions embodied therewith, the program instructions executable by a processor to cause the processor to:
    identify a RAID array, the RAID array comprising a plurality of storage volumes;
    identify one or more unused block of a provisioned volume in a RAID array;
    receive, from an administrator, a request to treat a file as high value;
    associate the file with a plurality of high value host writes;
    copy a redundant copy of the plurality of high value host writes to the unused blocks, wherein the copying comprises:
       for primary strips in the RAID array, creating one or more secondary strips mirroring the primary strips such that each of pair of primary-secondary strips reside on different storage volumes from each other;
       generating a primary-secondary strip mapping associating one or more primary strips containing the high value host writes with a corresponding one or more secondary strips; and
       storing the primary-secondary strip mapping in a bitmap;

detect a failure of a drive containing at least one of the primary strips; and in response to the detecting:

update the primary-secondary strip mapping to replace the at least one primary strip with one of its corresponding secondary strips;

restore the at least one of the primary strips from parity; and schedule creation of a new redundant copy of the restored primary strip.

11. A RAID controller, comprising a processor configured to execute instructions that, when executed on the processor, cause the processor to:

identify a RAID array, the RAID array comprising a plurality of storage volumes;

identify an unused block of a provisioned volume in a RAID array; and copy a redundant copy of selected host writes to the unused block, wherein the copying comprises:

for primary strips in the RAID array, creating one or more secondary strips mirroring the primary strips such that each of pair of primary-secondary strips reside on different storage volumes from each other.

12. The controller of claim 11, wherein the copying further comprises generating a primary-secondary strip mapping associating one or more primary strips containing the selected host writes with a corresponding one or more secondary strips.

13. The controller of claim 12, further comprising storing the primary-secondary strip mapping in a bitmap.

14. The controller of claim 12, further comprising instructions that, when executed on the processor, cause the processor to:

detect a failure of a drive containing one of the primary strips; and in response to the detecting, update the primary-secondary strip mapping to replace the one of the primary strips contained on the failed drive with one of its corresponding secondary strips.

15. The controller of claim 14, further comprising in response to the detecting:

restoring the one of the primary strips from parity; and scheduling creation of a new redundant copy of the restored primary strip.

16. The controller of claim 12, further comprising instructions that, when executed on the processor, cause the processor to:

receive, from an administrator, a request to treat a file as high value; and associate the file with one or more of the selected host writes.

17. The controller of claim 16, further comprising instructions that, when executed on the processor, cause the processor to:

receive, from the administrator, a request to stop treating the file as high value; and remove one or more secondary strips associated with the file from the primary-secondary strip mapping.

18. The controller of claim 11, further comprising instructions that, when executed on the processor, cause the processor to:

create the RAID array from a plurality of storage devices operably connected to a data processing system, wherein the RAID array comprises a plurality of blocks; and provision a first volume in the RAID array, wherein the provisioning comprises associating a first subset of the plurality of blocks with the first volume.

19. The controller of claim 18, wherein the first volume is associated with a first of a plurality of users of the data processing system.

20. The controller of claim 11, wherein the RAID array is configured with at least one spare storage volume; and further comprising further comprising instructions that, when executed on the processor, cause the processor to selectively enable the copying of the redundant copy of high value host writes to the at least one spare storage volume.

* * * * *